Dec. 12, 1967  V. J. MUSANTE ET AL  3,357,238
SURFACE PROFILE GAUGE

Filed Jan. 8, 1964  2 Sheets-Sheet 1

INVENTOR.
VICTOR J. MUSANTE
CHARLES ELLIS
GEORGE GEIER
ATTORNEY

INVENTOR.
VICTOR J. MUSANTE
CHARLES ELLIS
GEORGE GEIER
ATTORNEY

United States Patent Office 3,357,238
Patented Dec. 12, 1967

3,357,238
SURFACE PROFILE GAUGE
Victor J. Musante, New Hyde Park, N.Y., Charles Ellis, Andover, and George Geier, Teaneck, N.J., assignors to Keuffel & Esser Company, Hoboken, N.J., a corporation of New Jersey
Filed Jan. 8, 1964, Ser. No. 336,539
4 Claims. (Cl. 73—105)

The present invention relates to surface flatness determinations, and refers more particularly to an apparatus for measuring surface profiles in microinches.

The surface flatness of plates and similar hardware is extremely difficult to determine with a high-degree of accuracy. Measurements in micro-inches are especially difficult to obtain since displacement devices are impractical in this region. One method is to measure angular units of displacement corresponding to linear units of displacement and to convert the angular units back into linear units. Conversion is time-consuming unless the calculations are handled on a computer, and, even then, the presence of errors due to measuring techniques, is highly probable.

The present invention eliminates the error in computation by means of a sensing and computing apparatus utilizing a time delay correcting means.

One object of the present invention is to provide an apparatus for measuring the surface profile of a relatively flat surface.

Another object is to provide an apparatus for accurately measuring a surface profile in micro-inches.

Other objects will be apparent in the course of the following specification.

The objects of the present invention may be realized by an apparatus which comprises transducing means for changing vertical linear displacements into an electrical signal corresponding in magnitude and sign to the surface profile variations with respect to a reference surface and to a surface line traversed, correcting means for adjusting the electrical signal in time, and recording means for presenting the correct signal in readable form.

The invention will appear more clearly from the following detailed description when taken in connection with the accompanying drawings showing preferred embodiments of the inventive idea.

Figure 1:
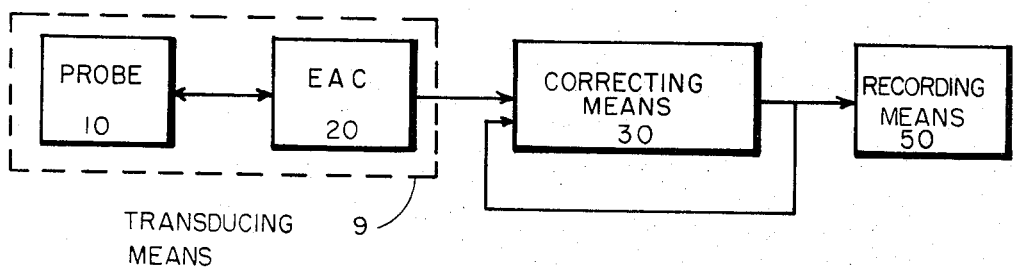
FIGURE 1 is a block diagram of one embodiment of the present invention.

In FIGURE 1, transducing means 9 comprises a probe 10 cooperating with an electronic autocollimator (EAC) 20. The output of transducing means 9 is directed to correcting means 30 and finally to recording means 50. A ray of collimated light from electronic autocollimator 20 is directed to probe 10 which senses vertical displacement as it is moved across the surface on a line of travel. The displacements produce angular variations of the reflected ray in a vertical plane. These variations are detected in the vertical plane by autocollimator 20 to produce a voltage output signal corresponding in magnitude and sign to the magnitude and direction of the reflected ray angle. The signal is directed to correcting means 30 where it is adjusted in time to account for the speed of the probe 10. The correcting means output signal after appropriate time delay is then combined with the autocollimator output signal. The correcting means output signal is simultaneously directed to recording means 50 for presentation in readable form. The correcting means 30 thus constantly monitors the signal. The time delay factor is a parameter of the system.

Figure 2:
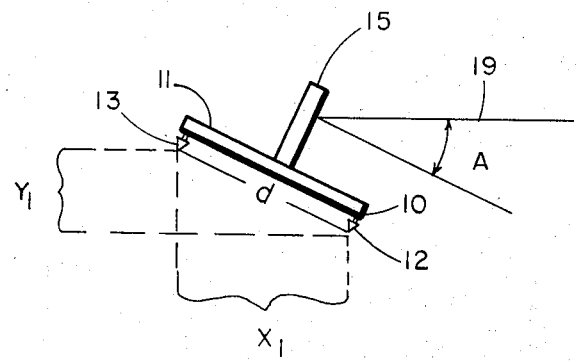
FIGURE 2 is a side view of a probe with an exaggerated tilt.

Probe 10 in FIGURE 2 comprises a carriage 11 with three supporting feet: leading foot 12, trailing foot 13, and a stabilizing third foot SF. A reflector 15 is mounted on the carriage 11 with its effective reflecting surface perpendicular to the line defined by feet 12 and 13. A normal to the reflecting surface is parallel to the line of feet 12 and 13. When the probe 10 is on a perfectly flat surface, a horizontal ray 19 incident on the reflector 15 is reflected back in the same horizontal plane. When either foot 12 or 13 is vertically displaced, the reflected ray is also displaced by an angle "A" in angular units proportional to the vertical displacement in linear units.

In FIGURE 2, $Y_1$ is the vertical displacement difference between foot 12 and foot 13 and $X_1$ is the horizontal displacement difference. The actual distance between foot 12 and foot 13 is $d$. The tangent of angle A is equal to $Y_1/X_1$ and it can be assumed that angle A is equal to the slope of the probe 10 with negligible error.

The probe feet 12, 13 may be wheels rotatably mounted on carriage 11. Probe 10 may be moved across the surface at a constant rate of speed or stepwise along the line of travel.

The reflector 15 is preferably a one-plane retro-reflector such as a Porro prism. The Porro prism is a 45°–45°–90° optical element with the two smaller faces having internally reflecting surfaces. An incident ray entering the largest face is internally reflected at each smaller face and emerges as a reflected ray in the same plane as the incident ray. When the incident ray lies in a plane normal to all three faces, the reflected ray is parallel to the incident ray as well as coplanar. When the Porro prism is mounted on the carriage 11 with the largest face perpendicular to the horizontal ray 19 and the normal plane horizontally disposed, all reflected rays due to pitching of the carriage 11 are in the same vertical deflection plane as the incident ray regardless of yawing of the carriage 11. Vertical displacement of either foot 12 or foot 13 with respect to the other foot produces corresponding angular displacement of a reflected ray in a vertical plane.

The electronic autocollimator 20 of transducing means 9 is both a source of collimated light and a one-plane angular sensing device. Its plane is vertically disposed and common with the vertical reflection plane. The magnitude and direction of the reflected ray angle are sensed and converted into a corresponding output voltage signal which does not originate from either foot 12 or 13 alone, but from the angle of tilt between them.

The voltage output signal of autocollimator 20 is directed to correcting means 30 where signal is adjusted to account for the speed of the probe 10 and for the distance $d$ between the foot 12 and the foot 13. Since distance and time are involved, the probe 10 and correcting means 30 must be synchronized. This may be accomplished by using the same motor drive for both components.

The correcting means 30 algebraically adds the signals produced by the autocollimator 20 when first the foot 12 and then the foot 13 pass over the same spot. The initial signal is delayed and then combined with the second signal at the proper instant. The resultant signal is directed to recording means 50 for conversion to a readable form such as a graph.

Figure 3:
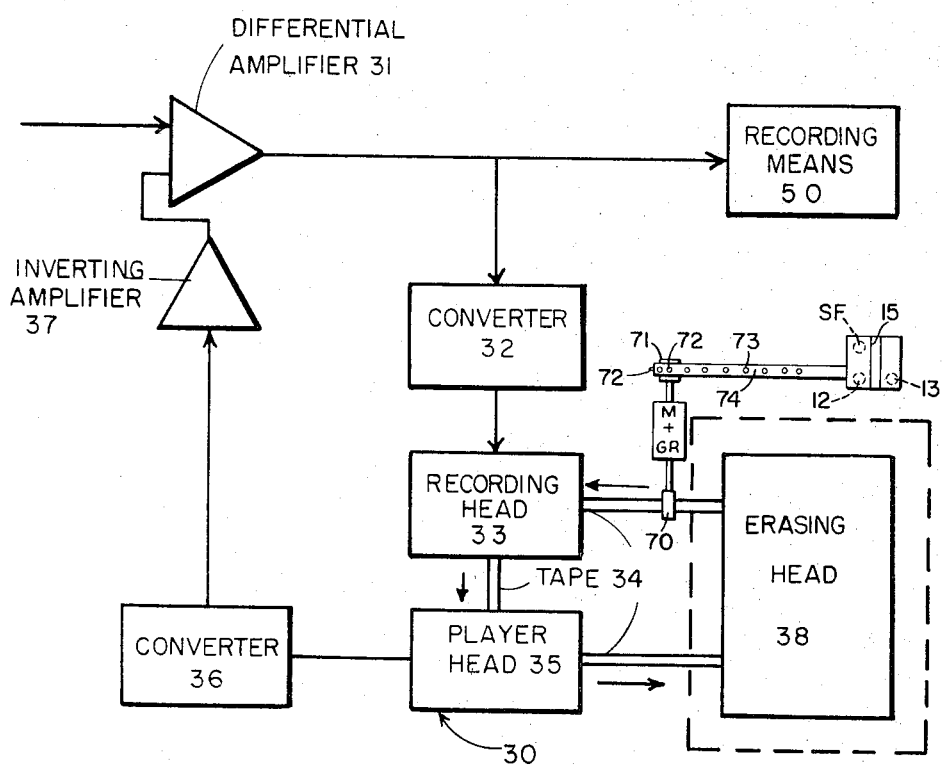
FIGURE 3 is a schematic diagram of one embodiment of the correcting means of the present invention including one form of driving means.

One embodiment of correcting means 30 shown in FIGURE 3 comprises: a differential amplifier 31 for enhancing the difference between two input signals; a voltage-to-frequency converter 32 for changing the voltage output signal to a corresponding frequency signal; a recording head 33 for impressing the frequency signal on tape; recording tape 34 for receiving and storing the frequency signal; playback head 35 carefully positioned with respect to recording head 33 for recalling the frequency signal on recording tape 34 at a later time depending upon the speed of the probe; tape transport means (not shown) for moving the recording tape 34 through recording head 33 and through play-back head 35 at a speed synchronous with the speed of the probe 10; a frequency-to-voltage converter 36 for changing the frequency signal to corresponding voltage signals; and an inverting amplifier 37 for modifying the voltage signal to form the second (or adjusting) input signal to the differential amplifier 31.

This particular embodiment may include an endless recording tape and an erasing head 38 for erasing the recorded signal from the endless tape after playback before the endless tape is fed into recording head 33.

The delayed signal is combined with the incoming signal from autocollimator 20 when trailing foot 13 is on the same spot formerly occupied by leading foot 12. The resultant combined signal from autocollimator 20 and the delayed signal from inverting amplifier 37 is directed to recording means 50 for automatic conversion to readable form and simultaneously to converter 32 to start the cycle again. Thus the incoming signal is constantly monitored by a delayed feedback system.

The signal storage system must hold information for a period depending upon the time parameter. This requires careful synchronization between the driving means for the probe 10 and the transport means for the tape. One method is to employ a common driving means shown as a motor M and gear reduction unit GR which drives a pair of pinch rollers 70 which feed the recording tape 34 and also drives a sprocket drum 71 having teeth 72 which engage apertures 73 in a belt 74 connected to the probe 11 whereby the probe is moved by the belt in synchronism with the recording tape 34 as described in predetermined speed relation.

Figure 4:
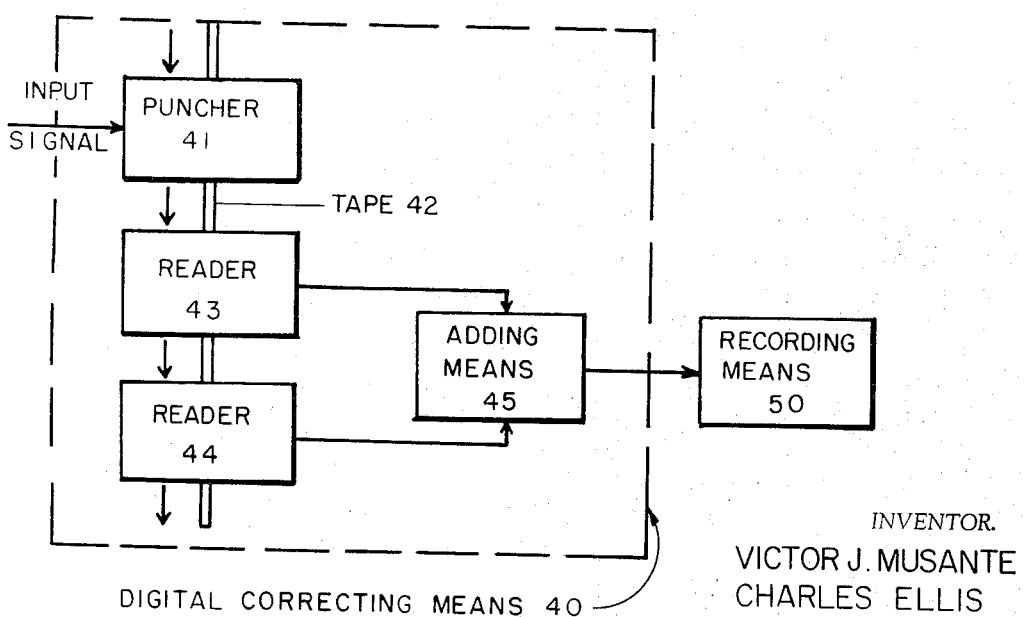
FIGURE 4 is a schematic diagram of another correcting means of the present invention.

The analog output signal of the electronic autocollimator 20 may be corrected by another correcting means 40 which digitizes the available information. In FIGURE 4, digital correcting means 40 comprises: a tape puncher 41 for converting the output signal from autocollimator 20 to coded punched holes on a tape moved through said puncher 41; a tape 42 for receiving signals as punched holes therein; a first tape reader 43 for converting the coded punched-hole signals on tape 42 to a corresponding first signal; a second tape reader 44 carefully positioned with respect to reader 43 for converting the coded punched-hole signal on tape 42 to a corresponding second signal at a later time depending upon the speed of the probe 10; tape transport means and probe driving means similar to that previously described provide for moving the tape 42 from reader 43 to reader 44 at a speed synchronous with the speed of probe 10; and adding means 45 for combining the adjusting first signal to the second signal for use in recording means 50.

The X and Y coordinates of the point printed by recording means 50 on a surface profile chart are controlled by the X and Y coordinates of the probe feet 12 and 13.

Figure 5:
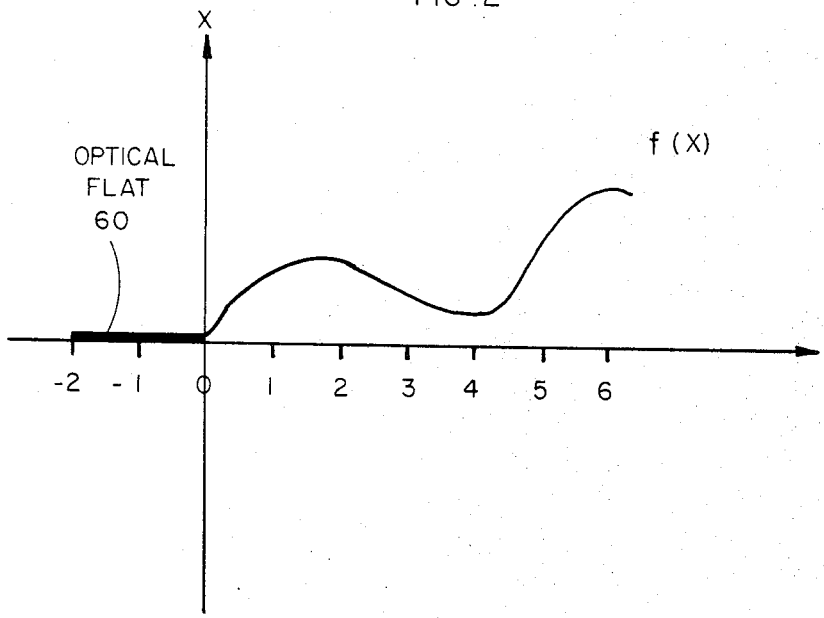
FIGURE 5 is a profile of a hypothetical surface.

FIGURE 5 shows a hypothetical surface profile where Y is a function of X, that is, the value of Y in vertical linear displacement units from an optically flat reference bar 60 depends upon X in horizontal linear displacement units from bar 60. The bar 60 is flat to within ⅓ wavelength over any 4″ length.

On the hypothetical surface Y equals zero for values of X equal to minus 2, minus 1, and zero. This hypothetical surface is shown as an optical flat 60 for these values which optical flat provides a reference from which the surface contour output is determined. This reference may be other than an optical flat but its characteristics must be known so the profile contour determined therefrom will be related to other surface contour values determined by the apparatus as the probe moves along the surface to be plotted.

For demonstration purposes, assume that $d$ equals 2X units and that the probe speed is 2X units per second. The time parameter is then one second. At the start of the track, probe 10 rests on bar 60 parallel to ray 19 from autocollimator 20. As probe 10 is moved along the hypothetical surface, foot 12 initially generates angular variations directly related to vertical displacements while foot 13 is still on bar 60. When the generator signal information is delayed for one second, and then added to the signal when foot 13 passes over the same point, the corrected output corresponds to the actual vertical displacement with reference to bar 60. The front foot is thus referenced to the back foot, and the result is values of Y over which the front foot 12 is moving.

TABLE I

| Foot 12 | | Foot 13 | | Angle Subtended by Probe | + Signal Delay of Contour Output | = Surface Contour Output |
|---|---|---|---|---|---|---|
| X Position | Y Value | X Position | Y Value | | | |
| 0 | f(0) | −2 | f(−2) | f(0)−f(−2) | + 0 | = f(0) |
| 1 | f(1) | −1 | f(−1) | f(1)−f(−1) | + 0 | = f(1) |
| 2 | f(2) | 0 | f(0) | f(2)−f(0) | + f(0) | = f(2) |
| 3 | f(3) | 1 | f(1) | f(3)−f(1) | + f(1) | = f(3) |
| 4 | f(4) | 2 | f(2) | f(4)−f(2) | + f(2) | = f(4) |
| 5 | f(5) | 3 | f(3) | f(5)−f(3) | + f(3) | = f(5) |
| . | . | . | . | . | . | . |
| n−2 | f(n−2) | n−4 | f(n−4) | f(n−2)−f(n−4) | + f(n−4) | = f(n−2) |
| n−1 | f(n−1) | n−3 | f(n−3) | f(n−1)−f(n−3) | + f(n−3) | = f(n−1) |
| n | f(n) | n−2 | f(n−2) | f(n)−f(n−2) | + f(n−2) | = f(n) |
| n+1 | f(n+1) | n−1 | f(n−1) | f(n+1)−f(n−1) | + f(n−1) | = f(n+1) |

Table I shows that delaying the signal by an appropriate time interval and adding this delayed signal to the incoming signal of autocollimator 20 produces a resulting signal corresponding to values of Y over which the leading foot 12 is moving.

In operation, probe 10 is set on reference bar 60 at one end of the surface to be measured. Autocollimator 20 is aligned with the reflector 15 of probe 10 to a null point, and its output signal is directed to correcting means 30 where it is adjusted in time to count for the distance between feet 12 and 13, and the traveling speed of probe 10. As the probe is driven over the surface, feet 12 and 13 follow the profile of the surface. In particular, the leading foot 12 and trailing foot 13 follow the surface profile on a line parallel to the horizontal ray 19. Any angular change between the plane of the reflector 15 and ray 19 indicates a change in the slope of the surface. The generated and correcting signal is presented in readable form by recording means 50 to indicate the surface profile in micro-inches with reference to bar 60. The apparatus has a sensitivity of about 1 to 2 micro-inches and an accuracy of about 5 to 6 micro-inches.

It is apparent that the present invention is capable of many variations and modifications. All such variations and modifications are to be included within the scope of the present invention.

What is claimed is:

1. A surface profile gauge for measuring surface irregularities in a line comprising a probe having a pair of sensing feet with one foot spaced from the other a fixed distance, a reflecting means mounted on the probe with the face thereof substantially perpendicular to a line drawn between the feet, means to move the probe over a surface to be gauged at a definite rate of speed, an auto-collimator for directing light to said reflecting means, said auto-collimator including sensing means to indicate the deflection of the light in accordance with the position of the feet of the probe and the extent of deflection of the beam of light in accordance with the relative displacement of the feet transverse to a line joining the feet, correcting means to store the information of the displacement for a period of time equal to the time required for the probe to move a distance for the trailing foot to reach the point previously occupied by the leading foot, and means to continuously record and compare the information whereby a profile of the gauged object can be accurately made.

2. An apparatus in accordance with claim 1 in which said correcting means comprises:
a differential amplifier for enhancing the difference between a first input signal and a second input signal to produce an amplifier output signal, the first input signal coming directly from said autocollimator;
a first converter for changing the amplifier output signal to a frequency signal;
a tape recording head for impressing the frequency signal on tape;
recording tape for receiving and storing the frequency signal until playback;
a tape player head carefully positioned with respect to said recording head for playback of the recorded frequency signal on said tape at a later time depending upon the speed of said probe;
tape transport means for moving said tape from said recording head to said player head at a speed synchronous with the probe speed to accurately delay the signal;
a second converter for changing the delayed frequency signal to a delayed voltage signal; and
an inverting amplifier for modifying the delayed voltage signal to form the second input signal to said differential amplifier, the signal from which is directed to said recording means and to said first converter.

3. An apparatus in accordance with claim 1 in which said correcting means comprises:
a tape puncher for converting the signal from said autocollimator to a coded punched hole signal on a tape;
a tape for receiving and storing the signal as punched holes;
a first tape reader for converting the coded punched hole signal into a first signal;
a second tape reader carefully positioned with respect to first reader for converting the punched hole signal on said tape to a second signal at a later time depending upon the speed of said probe;
tape transport means for moving a tape from said first reader to said second reader synchronously with the probe speed; and
adding means for combining the first signal and the second signal to produce a corrected signal for transmission to said recording means.

4. An apparatus for measuring surface profiles in a micro-inch range, which comprises:
a probe comprising a carriage and a Porro prism mounted thereon with its principal planes horizontally disposed, said probe being capable of producing vertical angular reflections of an incident light ray corresponding to micro-inch variations in a surface profile;
an electronic autocollimator optically aligned with said prism for directing an incident ray of collimator light thereto, for sensing vertical angular reflections of the ray, and for producing an output voltage signal corresponding in magnitude and sign to the reflected ray;
driving means for moving the probe across the surface on a line vertically parallel to the incident ray;
correcting means comprising:
(1) a differential amplifier for enhancing the difference between a first input signal and a second input signal to produce an amplifier output voltage signal, said first input signal coming directly from said electronic autocollimator;
(2) a first converter for changing the output voltage signal from said differential amplifier to a frequency signal;
(3) a tape recording head for impressing the frequency signal on tape;
(4) a recording tape for receiving and storing the frequency signal until playback;
(5) a player head carefully positioned with respect to said recording head for playback of the frequency signal on said tape at a later time dependent upon the speed of said probe;
(6) tape transport means for moving said tape from said recording head to said player head at a speed synchronous with the probe speed to accurately delay the signal;
(7) a second converter for changing the delayed frequency signal to a delayed voltage signal; and
(8) an inverting amplifier for modifying the delayed voltage signal to form a second input signal for said differential amplifier; and
recording means for presenting the corrected signal in readable form.

References Cited

UNITED STATES PATENTS 3,056,209 10/1962 Oliver _____ 73—105
3,251,135 5/1966 Reason _____ 73—105

RICHARD C. QUEISSER, *Primary Examiner.*

JAMES J. GILL, *Examiner.*

C. I. McCLELLAND, *Assistant Examiner.*